US005643621A

United States Patent [19]
Mehnert

[11] Patent Number: 5,643,621
[45] Date of Patent: Jul. 1, 1997

[54] FLAVOR ENHANCEMENT IN CULTURED DAIRY PRODUCTS

[75] Inventor: David W. Mehnert, Antioch, Ill.

[73] Assignee: Kraft Foods, Inc., Northfield, Ill.

[21] Appl. No.: 447,087

[22] Filed: May 22, 1995

Related U.S. Application Data

[62] Division of Ser. No. 218,505, Mar. 25, 1994, Pat. No. 5,462,755.

[51] Int. Cl.$^6$ .................. A23C 19/00; A23C 13/16
[52] U.S. Cl. .................. 426/36; 426/43; 426/804
[58] Field of Search .................. 426/36, 43, 804

[56] References Cited

U.S. PATENT DOCUMENTS

| | | | |
|---|---|---|---|
| 3,600,186 | 8/1971 | Mattson et al. | 426/804 |
| 4,020,186 | 4/1977 | Edwards | 426/36 |
| 4,066,800 | 1/1978 | Rosenau et al. | 426/582 |
| 4,075,360 | 2/1978 | Rule et al. | 426/582 |
| 4,748,025 | 5/1988 | Bachmann et al. | 426/43 |
| 5,158,796 | 10/1992 | Bernhardt et al. | 426/804 |
| 5,175,013 | 12/1992 | Huang et al. | 426/565 |

*Primary Examiner*—Jeanette Hunter
*Assistant Examiner*—Choon P. Koh
*Attorney, Agent, or Firm*—Debbie K. Wright; Arnold, White & Durkee

[57] ABSTRACT

Methods and compositions for flavor enhancement and development in a cultured dairy product employ identification and selection of fat fractions from sources such as milk(butter) fat for use as flavor precursors. The selected fractions are added to the product at a step in the manufacturing process where they are available for flavor development by means characteristic of the product. The selected fractions are preferably enhanced for fatty acids and have low melting points. For a reduced fat product, the flavor precursors are generally added in combination with a fat substitute. Homogenization of all the aqueous protein component in this type of product was an improvement over homogenizing only a portion of this component. The invention is particularly suitable for production of reduced fat cultured dairy products.

26 Claims, No Drawings

FLAVOR ENHANCEMENT IN CULTURED DAIRY PRODUCTS

This application is a divisional of application Ser. No. 08/218,505, filed Mar. 25, 1994 issued as U.S. Pat. No. 5,462,755 on Oct. 31, 1995.

BACKGROUND OF THE INVENTION

This invention relates methods and compositions for development or enhancement of flavor in foods in which flavor develops from the action of enzymes and/or bacteria on flavor precursors. The invention is advantageous in particular for foods manufactured to have reduced fat or to be fat free, in particular for filled cultured dairy products that have a fat substitute. The methods include altering the sequence of steps generally used to manufacture some filled products so that all the aqueous protein composition is homogenized.

Flavor is an elusive, complex, yet necessary component of foods. Some of the most distinctive and popular flavors characterize cultured dairy products. Therefore, it is a challenge to produce a reduced fat cultured dairy product that has a flavor equal to its full fat counterpart. Without flavor, these products are unacceptable to consumers, even though they may fulfill consumers' requests for healthier products.

One category of healthier products is a group of foods characterized as reduced fat, low fat, or fat free. Although these food products have been successfully manufactured, for many of these products, flavor is unsatisfactory to consumers when compared to the flavor of the comparable product that contains fat at natural levels. This is a particular problem for dairy products which rely in part on milk fat for flavor.

Milk fat provides flavor preferred by consumers. Development of flavors in dairy products such as cheese with a milk fat component is complex, and not well understood (Chapman and Sharpe, 1981). For example, flavor development in yogurt milk is believed to involve many processes, including fermentation of milk sugar, enzymatic and chemical reactions involving peptides and amino acids as precursors, for fat degradation (Table V, p. 265 Robinson, 1981).

Unfortunately, problems have arisen in attempts to preserve the milk fat flavor in dairy products designed to meet trends in consumers eating patterns based on health-conscious avoidance of high fat and/or high cholesterol foods. As pointed out in Chapman and Sharpe (1981), ". . . Cheddar cheese made from skim milk has no Cheddar flavor at all." Although the reason for this flavor loss is not clear, removal of flavor precursors during processing is a potential factor.

Milk fat flavor is believed to be an amalgamum of many components including short-chain fatty acids ($C_4$ to $C_{10}$), lactones, methyl ketones, aldehydes, esters, alcohols, hydrocarbons, aromatic compounds, indole, methyl indole, phenolic compounds, and dimethyl sulfide (Kaylegian et al., 1993). Therefore, seeking a solution to flavor loss or flavor degradation, was not expected to be straightforward. Focusing on a single factor or set of factors would be thought too simplistic to improve flavor significantly.

Problems in using modified milk fat in foods are reviewed by Kaylegian et al. (1993). Expanded use of milk fat in foods, where it can contribute substantially to flavor and quality, is frequently inhibited because of functional incompatibilities with other ingredients. Although various processes modify milk fat to create specialty milk fat ingredients, milk fat functionality cannot always be predicted in complex food systems.

Consumers have indicated they would eat more lower fat products made with fat replacers than traditionally made products if they liked the taste. (Bruhn et al., 1992). Recognizing the importance of flavor to the consumer, attempts have been made to improve the flavor of reduced fat, low fat, or fat free dairy products, but there still remains a need for a simple, reproducible, relatively inexpensive method to create flavors that are acceptable to consumers, without defeating the purpose of manufacturing a healthy product.

A possible solution to flavor loss is to add flavor to the end product to replace that lost during processing. However, attempts to simulate milk flavors synthetically using fatty acids have not been successful. (Ha and Lindsay, 1993.) The flavor of milk fat is complex and difficult to duplicate synthetically because many of the flavor compounds in milk fat exist in the bound or precursor state and are released upon heating (Kaylegian, et al. 1993).

Other suggested reasons that the quality of reduced fat cultured dairy products does not compare favorably with full fat counterparts, include possible degradation of milk protein in producing a "filled dairy product."

A filled dairy product is one in which all or part of the dairy fat is removed and replaced by a vegetable sourced oil ("filled milk" or "filled cream"). The oil is either digestible (for example, soy bean oil) or undigestible (for example, polyol fatty acid polyester (PFAP)), a synthetic fat, or any imitation fat. Filled dairy products require the production of a filled milk or filled cream, which is subsequently diluted to a standardized fat level (for example, in a cheese vat). Subsequent manufacturing steps depend on the product and are well-known to those of skill in the art for full fat products (for example, for cheese). The high shear homogenization step in the manufacturing process is said to affect product quality, at least for certain cheeses. Davis (1965) teaches that homogenization to reduce fat droplet size from 4 microns to 1 micron will increase viscosity and yield a smoother curd. Additionally, Davis cautions that homogenization changes the physical properties of milk casein which leads to a weaker rennet curd.

A U.S. patent relating to cheese products, Bodenstein et al. (U.S. Pat. No. 5,080,912) teaches that it is essential that a substantial amount of milk protein not be impaired by the effects of homogenization (high shear) if high quality filled cheese products are to be produced. Bodenstein teaches not subjecting all the milk protein to high shear homogenization for manufacture of cheese products with polyol fatty acid polyesters.

The present invention addresses the problem of inferior product quality, in particular when the product is a filled cultured dairy product.

SUMMARY OF THE INVENTION

A serious problem in cultured dairy products made by manufacturing processes designed to reduce or eliminate fat, is that the flavor is not as acceptable to consumers as is the flavor from a product made in the same fashion except for the fat reduction steps. The poorer flavor is believed to result at least in part from the absence or reduction of fatty acids as precursors for degradation into flavor components. The absence or reduction of fatty acids is due to the use of low-fat bases such as skim milk, and the substitution for the lost fat by fat mimetics or replacements such as polyol polyesters. Addition of flavor fractions during processing using methods and compositions of the present invention, overcomes this problem. Other reasons proposed for product degradation include homogenization of milk protein. Contrary to teachings in the art, even greater product improvement results from both homogenizing a substantial portion, rather than a small part, of milk proteins used in the manufacture of some dairy products and adding flavor precursors.

1. Flavor Enhancement

An aspect of the present invention is based on the demonstration that flavor loss in the preparation of reduced fat foods is principally due to lack or loss of precursors of flavors during the manufacturing process. This is particularly evident for cultured dairy products for which enzymatic degradation of milk fat contributes to flavor.

Because the development of flavor is complex, a simple solution to improvement of flavor in cultured dairy products, in particular those from which fat is removed, was not expected. Furthermore, focusing on only one component, flavor precursors, as a means to improve flavor, was not expected to solve the problem of unacceptability of the product because other factors could also be important.

Surprisingly, the present invention solves the problem of flavor loss in a food by identifying and selecting a flavor precursor component of fat, and adding the component to a food at a stage in the manufacturing process where it is available for subsequent flavor development and enhancement. The flavor enhancing components are thereby concentrated in a food, and undesirable or unnecessary fats are left out.

Precursors are preferably derived from milk fat, although animal fat or any fat that is characterized by heterogeneity of its fatty acid (triglyceride) components, is also suitable. The present invention enhances flavor by enriching for flavor precursors with low melting point triglycerides obtained by fractionation. When added to a skim milk base the fractions remain in the mixture rather than separating from it ("oiling out") as expected. Another aspect of the invention is that it does not increase the fat content of the finished product so that the product is no longer a "no fat" or "reduced fat" product because only a relatively small amount of a fraction or fractions need to be added, and in the process of flavor development, the precursor fats that are added are degraded mostly to non-fat products. By "relatively small" is meant generally less than 6% of the finished product; preferably less than 2%.

The methods and compositions of the present invention are particularly suited for cultured dairy products. By a cultured dairy product is meant a product that requires a microbial culture or its enzymatic equivalent, for production of a distinguishable product from a milk protein. Cultured dairy products include, without limitation, natural cheese, yogurt, cream cheese processed cheese and sour cream.

Flavor development in cultured dairy products results, in part, from the degradation of free fatty acids that are released from milk fat during processing. ("Milk fat" is used interchangeably with "butter fat" herein). This degradation is generally provided by microbial or enzymatic digestion.

The four elements required for flavor production in a cultured dairy product are: (1) substrate (milk); (2) enzymes (milk lipase, starter and non-starter organisms, lipase/esterase from ripening systems); (3) spatial orientation (reactions tend to occur at membrane surfaces and oil/water interfaces); (4) environmental conditions (temperature, time, Ph, water, ions).

The specific agents used to achieve flavor development are correlated with the specific flavor that identifies the product as, for example, a Cheddar cheese as distinguished from a Parmesan cheese. Changes which occur during the ripening of a specific product such as Cheddar cheese, are essentially the controlled degradation of the milk carbohydrate, protein and butterfat. Cheddar flavor consists of taste components which are non-volatile, and aroma components which are volatile. Non-volatile components include fat.

Butterfat contributes significantly to flavor production in cultured dairy products. Butterfat is a very heterogeneous mixture of triglycerides composed of mixtures of long, medium and short chain length fatty acids. All triglyceride fats in butterfat do not contribute equally to flavor production. In addition, certain fat components are preferred precursors for certain foods. This is because, for example, enzymes in cheese-making systems are more active against short and medium chain triglycerides than against long chains.

The methods and compositions of the present invention solve the flavor problem by using a fat fraction or combinations of fractions that are liquid at low temperatures, as prime flavor precursors. The fractions contain triglycerides with various fatty acid chain lengths. The flavor precursors are added at or before a step in the manufacturing process where they are available for the degrading agents for flavor development or enhancement. The step at which the fractions are added may vary, although preferably it is at or before the addition of starter cultures.

Flavor precursors for use in accordance with the present invention are preferably derived from milk fat, although they may be produced synthetically if their structure is known. Animal fats are another good source of flavor precursors. Vegetable fats are also suitable although generally they are less heterogeneous.

To identify and select flavor precursor components, the source of the fatty acids, preferably milk fat (butterfat) is fractionated, for example by melting point differences, into a large number of identifiable, reproducible fractions.

Triglycerides are composed of glycerol and three fatty acids. Over 100 fatty acids have been identified in milk fat and of these, approximately 12 make up 90% of the fatty acid composition. At least 400 peaks representing fractions of fatty acids are distinguishable after fractionation by gas chromatography, for example. Chain length and the degree of saturation affect melting temperature which is one of the physical characteristics of the fatty acids that is used in the present invention as a separating feature. The fractions are obtained by making use of differential melting temperatures, short path distillation and the like.

Fractions are not homogeneous populations of triglycerides, but rather include a mixture of chain lengths and bond saturations. However, at the lower end of the distribution of fractions separated by melting point differences, there are more likely to be shorter chain lengths than at the higher temperature end of the distribution. In addition to fractions at the lower end of the distribution being enriched for short chain fatty acids, these fractions are more likely to contain unsaturated fats.

Fractionation of the fat may be accomplished by methods such as controlled crystallization and separation ("dry fractionation"), short path distillation, vacuum distillation or solvent extraction methods. Differential scanning colorimetry (DSC) is suitable to monitor the dry fractionation of milk fat. For particular embodiments, fractions may be highly purified, and combinations of the fractions may be identified and selected that impart optimum flavor to a dairy product.

For vacuum distillation, a vacuum of 1–5 µm Hg at a temperature range from 100° C. to 200° C. is suitable, 110°–120° C. is preferred.

For supercritical $CO_2$ extraction, a temperature of between 50°–80° C. and a pressure of between 100–350 bar (1500–5000 psi) is suitable.

Regardless of the method of fractionation, fractions are selected for use in the present invention because of their ability to produce desirable flavors in food such as cultured dairy products. To determine the optimum fractions of fat to add to a cultured dairy product to enhance flavor, concentrated fractions are obtained by methods such as molecular distillation, solvent extraction, or a multiple step crystallization. The ability of the fraction to be degraded by microbial cultures used to process a particular food is screened by use of a fat soluble dye such as Victoria Blue, to identify degradation of fat fractions.

A preferred fraction to employ from fractions produced by subjecting butterfat to temperature cuts, is that fraction which is liquid at approximately 74° F. Even more preferred is a fraction that remains liquid when cooled to 45° F.

To use each fraction, or combination of fractions, to enhance flavor, the fraction or combination is added to a food product. The fraction is preferably added to the milk, and conventional steps are subsequently followed. The fraction is added during the manufacturing process at or prior to the time when flavor development generally occurs, that is, when enzymatic processes related to starter cultures are operative.

Although short to medium chain triglyceride butterfat fractions are likely to contribute the most flavor to products, "harder" or longer chain fractions may be useful to "fine tune" flavor or texture in some products e.g. to prevent undesirable "greasing" of low solids polyol polyester at the surface of natural cheese as it warms to room temperature. Triglycerides typical of butterfat may be considered as "lighter" (from 26–42 carbon atoms) or "heavier" (from 44 to 54 carbon atoms). (Deffense, 1992) In another categorization, by "short chain fatty acid" is meant an acid with a chain of from 4–10 carbon atoms; a "medium chain" has 12–15; and a "long chain" has more than 16 carbon atoms (Amer et al., 1985). The general melting profile for a typical whole milk fat is from −25° C. to 10° C. (low), of the middle species is about 10° C. to 19° C.; and a broad high melting fraction about 20° C. and above. Longer chain fatty acids that are useful for the methods and compositions of the present invention include those melting at about 14°–22° C.

The enzymes and bacteria that act on flavor precursors of a particular product, prefer specific chain lengths and degrees of saturation in their substrates. For example, in yogurt, some degree of fat degradation is effected by the starter cultures used. The end products of this degradation contribute to flavor. Lipases from the starter culture appear to be especially active against short-chain triglycerides. Therefore, one means for predicting which melting point fractions are preferred for enhancing flavor in a particular food product, is to determine as a preliminary screening, whether enzymes known to be related to flavor development in the product degrade a particular fraction. The favorite substrate of microbial cultures or enzymes used to process the food may be determined by relative activity against the fraction or fractions. A fraction or fractions enriched for preferred substrates may be selected as flavor precursors.

Determination of the optimum fraction or fractions of flavor precursors for a particular product proceeds by adding a bacterial flora or enzyme(s) characteristic of the product, to a sample of fractions selected from various points of the melting point distribution, and determining which fractions are optimum substrates for the flora. A suitable substrate may also be ascertained by analysis of end products of the chemical reactions of the flora or enzymes in a particular food.

Alternatively, if the substrate preferences for flavor producers is known, the composition of the fractions are analyzed for the substrate, and fractions are selected as flavor precursors based on the nature and amount of substrate present in the fraction.

After fatty acids are separated, identified, and selected as suitable for a particular product, the flavor producing molecules are added in the processing steps prior to degradation in the product by, for example, microbes or enzymes. Flavor development typically occurs, for example, by the normal series of reactions such as enzyme or microbial degradation, leading to the characteristic flavor of the product. If a reduced fat product is desired, the fat fractions are added together with the fat substitutes (also termed fat replacements or mimetics) such as polyol polyesters, which are directed toward producing a healthier food. The lipophilic nature of some of the substitutes, for example, polyol polyesters, is expected to maintain the short chain fatty acids added as precursor components during production to enhance flavor within the cultured dairy product.

If the end product is a reduced fat product or a no fat product which has a fat substitute, the selected fractions are combined with the fat substitute (fat replacement, fat mimetic) and are added to a process for manufacturing a natural cultured dairy product, at a time in the process where the combination is available at or before enzymes or starter cultures are operative. The fractions are precursors for further flavor development. Prior to adding the precursors during the manufacturing process, a fat substitute (mimetic or replacement or the like) is combined with a fat fraction produced at a low temperature and mixed until well distributed. Preferably, a fat substitute capable of being melted is used.

A fat substitute is any mimetic or replacement that when added contributes to the product a characteristic of the full-fat product, for example, acceptable mouth feel. The fat substitutes may be a non-digestible fat. A suitable non-digestible fat is a polyol polyester. A preferred polyol polyester is a sucrose polyester. Use of sugar or sugar alcohol fatty acid polyesters in the present invention allows a reduction in calories of the food products, because the esters are not capable of being absorbed in the digestive tract. Gums and gels are not preferred for the practice of the present invention.

By taking advantage of the natural process of flavor development after providing a precursor composition during the manufacturing process, the fat level of the product decreases as flavor develops, because many of the natural flavors, although developed from fats, are not themselves fats. Rather, many flavors are sugar alcohols, ketones, esters and the like.

Flavor evaluation by expert graders and/or sensory panels is used to identify the effect of a fraction on flavor. By following this procedure, the most flavor can be produced using the lowest amount of precursor fat.

Fractions or groups of fractions, are tested for flavor enhancement by adding them during the manufacturing process, and conducting blind tests for flavor acceptability and comparison of flavors of (1) the same type of dairy products produced to contain reduced fat, but not benefitting from the methods and compositions of the present invention; and (2) the full fat product. These tests are conducted in a blind fashion, with a predetermined scoring system that evaluates texture, mouthful, flavor and "overall liking" of the food.

A "hedonic" 1–9 evaluation scale such as that used herein is subjective, but is reproducible given the same panel of experts, and is comparable across panels. An "anchor" is generally provided as a "one." A score of 7 is generally good, 9 is rare. Even a 1 point difference is considered significant because it approximates a 10% difference. The tests are commonly used in the field of food testing.

The cultured dairy products of the present invention have been found acceptable by appropriate blind taste tests conducted by experts in the field of taste testing dairy products.

Cultured dairy products prepared by the methods of the present invention include Cheddar, Swiss and Parmesan cheese, and yogurt. It was surprising and unexpected that the addition of such relatively small amounts of butterfat fractions during the processing of these foods, effectively overcame the flavor loss characteristic of reduced fat dairy products. The products of the present invention are suitable for use in the manufacture of processed products such as processed cheese (cheese spreads, cheese slices and the like).

It was also surprising and unexpected that the liquid fractions would remain in the milk. It was expected that the fractions would "oil" out of the product. Possibly their maintenance is due to the formation of micelles or lipid globules or lipid-like globules.

The methods of flavor enhancement of the present invention are not limited to products which would benefit from flavor development or enhancement due to loss of flavor in processing aimed at reducing fat. Identification and selection of flavor precursors, and addition of the precursors prior to the time of flavor development, may be used in any type of food product wherein the flavor precursors of the present invention lead to the development of acceptable flavors in the product, when acted upon by the inherent flavor development steps of the manufacturing process leading to the product. For full fat products, the methods and compositions of the present invention are useful to improve or enhance flavor, or to change flavor.

2. Beta Glycan as a Flavor Precursor Carrier

Beta glycan in either purified form or as found in the cell wall material of yeast, binds lipid. Therefore, yeast cell walls are useful as fat mimetics or as a carrier for flavor precursors. The walls are approximately the same size as a milk fat globule, are round, and hold water. Yeast cell walls are combined with fractions of the present invention, preferably during reconstitution of the yeast cell walls with water or milk. Yeast cell wall material is commercially available under the tradename Engivita™+ or (Gist-Brocades).

By combining a relatively small amount of a suitable precursor fraction from butterfat with either beta glycan or partially purified yeast cell wall material, the flavor precursor can be maintained within the cultured dairy product, for example, a cheese curd during manufacture, consequently being available for the normal series of reactions leading to typical flavors. Although other systems based on encapsulation of liquid fats exist, they are limited in delivery of liquid oils to a cheese matrix, for example, and presentation of these oils to the lipolytic enzymes present in the food.

To use yeast cell walls in the present invention, partially purified yeast cell wall material (YCW) suspended in warm skim milk is combined with the low temperature liquid butterfat fraction and mixed. The YCW/flavor precursor oil mixture is then cooled to typical cheese making temperature and mixed with the vat milk. From this point on conventional cheese making techniques are employed to complete the manufacture of the cheese. The cheese must be aged for an appropriate time with or without added ripening enzymes at a prescribed temperature for the cheese flavors to develop.

3. Homogenizing A Substantial Portion of the Aqueous Protein Composition

The methods of the present invention are to homogenize a substantial portion of the total quantity of an aqueous protein component after a fat substitute is added. A "substantial portion" is defined herein as 50–100% of the total aqueous protein added during manufacture of a filled dairy product. The homogenizing step may be followed by conventional processing steps, for example, adding an acidifying agent. This is of particular use for making cheese, for which manufacture of filled cheese using polyol fatty acid polyester (PFAP) is improved by homogenizing the PFAP in the presence of a substantial portion of the milk intended for cheese making, rather than only homogenizing a small portion of the milk protein. Preferably 100% of the aqueous substitute protein is homogenized with the fat substitute, although 50–100% is suitable for the practice of the invention. Improvements result in flavor, texture and mouthfeel that mimic the full fat counterpart.

As indicated, improved quality products, based on flavor, appearance, texture and mouthfeel are produced with polyol fatty acid polyester material as a fat substitute if it is homogenized in the presence of the entire volume of milk to be used for cheese making.

This improvement may be due to better emulsification capacity existing when milk protein (caseins) are in excess during the homogenization step. This method more efficiently reestablishes lipid globule/water interface where many important reactions occur. Relating back to the four elements for flavor production, this effect is on spatial orientation. When the same style of cheese is made with butterfat instead of PFAP, and all of the milk protein is homogenized, the texture of the product is very crumbly and brittle which does confirm the findings of Davis (1965). However, the present findings are contrary to the teachings of Bodenstein, that cheese made with a polyol polyester will be of inferior quality if all the aqueous protein is homogenized. "Homogenized" is defined herein as shearing the milk protein to droplets of less than 12 microns.

The present; invention produces PFAP filled cheese products of a quality comparable to their high fat counterparts without an intermediate step of making a filled cream, disproving previous teachings that high shear applied to all the milk protein would result in an inferior product.

A crude PFAP emulsion is made by a number of methods such as, using low shear pumps, injection under pressure, passage through wire screens, sonication or a high speed blender. It is useful if the PFAP is melted and the milk is heated to approximately 150° F. at this stage. Subsequent steps in a conventional dairy homogenizer can be completed at lower temperatures which may be preferred. These steps are the "high shear" type of homogenization. Methods suitable for this step include injection under pressure into a flowing stream or spray drying. The latter process is associated with products having longer shelf life. The PFAP milk for cheese making is then directly delivered to the cheese vat for cheese making.

In the methods of the present invention, the melted fat substitute or replacement fraction is combined with skim milk, which is warmed to a temperature of 150° F. (65.5° C.), and homogenized to form an emulsion. Cooling the emulsion to a temperature suitable for a particular cultured dairy product is facilitated, after which conventional processing procedures are employed suitable for a particular end product, for example, for cheddar cheese.

DETAILED DESCRIPTION OF THE PREFERRED EMBODIMENTS

Embodiments of the flavor enhancement methods and compositions of the present invention vary in fat source for fractionation, method of fractionating the fat, composition of the fractions selected to add to a food, the food to which a fraction is added, the point in the food processing when a fraction is added, and the nature of the components added in conjunction with the fraction, for example, fat substitutes.

Fats and oils are predominantly triesters of fatty acids and glycerol, commonly called "triglycerides." They are insoluble in water but soluble in most organic solvents. They have lower densities than water and at normal room temperatures range in consistency from liquids to solid appearing substances. When solid appearing, they are referred to as "fats" and when liquid they are called "oils." Here the term "fat" will be applied to both liquid and solid appearing fats or oils.

The term "lipids" embraces a variety of chemical substances. In addition to triglycerides, it also includes mono- and diglycerides, phosphatides, cerebrosides sterols, terpenes, fatty alcohols, fatty acids, fat-soluble vitamins, and other substances.

The oils and fats most frequently used in the U.S. for salad and cooking oils, shortenings, margarines, and salad dressings include soybean, corn, cottonseed, palm, peanut, olive, low erucic acid rapeseed (canola), safflower, sunflower, coconut, palm kernel, lard, and tallow. Specialized vegetable oils of lesser availability in the U.S. include rice bran, shea nut, illipe, and sal.

Triglycerides normally represent over 95% of the weight of most food fats and oils. The minor components include mono- and diglycerides, free fatty acids, phosphatides, sterols, fatty alcohols, fat-soluble vitamins, and other substances.

Saturated fatty acids contain only single carbon-to-carbon bonds and are the least reactive chemically. The melting point of saturated fatty acids increases with chain length. Decanoic and longer chain acids are solids at normal room temperatures. Unsaturated fatty acids. Fatty acids containing one or more carbon-to-carbon double bonds are termed "unsaturated."

In the Geneva system of nomenclature, the carbons in a fatty acid chain are numbered consecutively from the end of the chain, the carbon of the carboxyl group being considered as number 1.

Fractionation of fat for the practice of the present invention is suitably performed by one oft he many methods known to the art. Choice of a method generally depends on the equipment available. Crystallization methods separate triglycerides based on their melting point, and there are other methods that rely on the solubility or volatility of the triglyceride species.

Fractionation is the removal of solids at selected temperatures. The most widely practiced form of fractionation is that of crystallization wherein a mixture of triglycerides is separated into two or more different melting fractions based on solubility at a given temperature.

As the chain length of the fatty acid increases, the melting point also generally increases. Thus, a short chain saturated fatty acid such as butyric acid will have a lower melting point than the saturated fatty acids with longer chains and even some of the higher molecular weight unsaturated fatty acids, such as oleic acid, and these properties will be reflected in triglycerides. However, degree of saturation also effects melting point, for example of triglycerides.

The term "dry fractionation" frequently is used to describe fractionation processes such as winterization or pressing. Winterization is a process whereby a small quantity of material is crystallized and removed from edible oils by filtration to avoid clouding of the liquid fractions at refrigeration temperatures. Originally this processing was applied to cottonseed oil by subjecting the oil to ambient winter temperatures, hence the term "winterization." Today many oils, including cottonseed and partially hydrogenated soybean oils, are winterized. A similar process called "dewaxing" can be utilized to clarify oils containing trace amounts of clouding constituents.

Pressing is also a fractionation process sometimes used to separate liquid oil from solid fat. The process squeezes or "presses" the liquid oil from the solid fat by means of hydraulic pressure. This process is used commercially to produce hard butters and specialty fats from such oils as palm kernel and coconut.

Solvent fractionation is the term used to describe a process for the crystallization of a desired fraction from a mixture of triglycerides dissolved in a suitable solvent. Fractions may be selectively crystallized at different temperatures after which the fractions are separated and the solvent removed. Solvent fractionation is practiced commercially to produce hard butters, specialty oils, and some salad oils from a wide array of edible oils.

A preferred source for the fat fractions is milk fat wherein the milk is not limited to cow's milk. Fractionation by crystallization from melted milk fat is also known as fractionation from the melt, or dry fractionation, because it does not employ solvents or additives. (Defense, 1992) Fractionation is a thermally controlled process in which the milk fat is subjected to a specific temperature-time profile to allow a portion of the milk fat to crystallize. The crystals are then physically separated from the liquid fraction using vacuum filtration, pressure filtration in a membrane filter press, centrifugation, an aqueous detergent solution, and other separation techniques. (See Kaylegian, 1992)

Milk fat can also be fractioned from a solution of milk fat that has been dissolved in a solvent prior to crystallization. The solvent generally employed is acetone, but solvents such as ethanol and pentane have also been used. This process is also thermally based and conducted in a manner similar to fractionation from melted milk fat, but an additional step occurs at the end of the process to remove the solvent.

Milk fat can also be fractionated by the use of supercritical carbon dioxide extraction. Milk fat fractions are selectively dissolved in the supercritical carbon dioxide by changing the temperature and pressure of the system. The carbon dioxide vaporizes at atmospheric conditions and, thus does not leave residues in the milk fat fractions.

Kankare and Alkia have shown that over 99% of the cholesterol can be removed while fractionating fat on the basis of triglyceride size using a method of extraction with supercritical carbon dioxide and by connecting an absorbent column filed with silica gel to the extracting system. Supercritical extraction operating under conditions in which the temperature and pressure of the solvent gas are higher than their critical value, is suitable for enriching or improving compounds.

Milk fat has also been fractionated by short path distillation on a research scale. Short path distillation is a form of vacuum distillation used to separate compounds based on their molecular weight, melting temperature, volatility, and intermolecular interaction.

Depending on the fractionation method or combination of methods, it is possible to separate butterfat into a large number of fractions. The physical and chemical characteristics of fat fractions determinable by methods reviewed by Amer et al., 1985. In Tables 1 and 2, the fatty acid distribution separated by chain length is compared to unfractionated butterfat (control) versus fractions produced by a) short path distillation; or b) crystallization.

For short path distillation under the conditions used (190° C. @ 0.003 mm Hg) 3% of the volume of the original butterfat becomes a distillate (vapor) and the remaining 97% is a residue. The distribution in Table 1 shows an enrichment of the fractions for short chain fatty acids, in particular in the distillate.

The distribution of fatty acid chain lengths in the residue and the crystallization fractions at 45° F. and 74° F., are similar to those of unfractionated butterfat.

Table 2 presents an analysis of the same components as shown in Table 1, but showing carbon number instead of fatty acid chain length. Using carbon numbers as a yardstick, there is a greater enrichment for lower numbers in the fraction that is liquid at 45° F. as compared to that liquid at 74° F.

TABLE 1

Fatty Acid Distribution After Fractionation

| Volume % Chain Length | 100 Butterfat Control % | Short Path Distillation* | | Crystallization | |
|---|---|---|---|---|---|
| | | 3 Distillate % | 97 Residue % | 5 Liquid @ 45° F. | 50 Liquid @ 74° F. |
| 4:0 | 3.6 | 9.5 | 3.3 | 3.8 | 3.7 |
| 6:0 | 2.2 | 5.1 | 2.1 | 2.4 | 2.3 |
| 8:0 | 1.3 | 3.9 | 1.2 | 1.4 | 1.3 |
| 10:0 | 2.8 | 7.2 | 2.6 | 3.1 | 2.8 |
| 12:0 | 3.2 | 6.9 | 3.0 | 3.4 | 3.0 |
| 14:0 | 10.4 | 15.2 | 10.1 | 9.6 | 9.7 |
| 14:1 | 1.6 | 1.6 | 1.6 | 1.9 | 1.6 |
| 16:0 | 27.3 | 24.8 | 27.4 | 21.4 | 26.7 |
| 16:1 | 2.6 | 2.0 | 2.6 | 2.4 | 2.1 |
| 18:0 | 11.6 | 5.7 | 11.9 | 9.1 | 11.7 |
| 18:1 | 20.2 | 9.8 | 20.8 | 21.8 | 25.0 |
| 18:2 | 2.6 | 1.2 | 2.6 | 2.6 | 3.0 |

*Conditions: 190° C. @ 0.003 mm Hg

TABLE 2

TRIGLYCERIDE CARBON NUMBER DISTRIBUTION

| Volume % Carbon # | 100 Butterfat Control % | Short Path Distillation | | Crystallization | |
|---|---|---|---|---|---|
| | | 3 Distillate % | 97 Residue % | 5 Liquid @ 45° F. | 50 Liquid @ 74° F. |
| C24 | <0.1 | 1.2 | <0.1 | 0.2 | 0.1 |
| C26 | 0.2 | 3.2 | <0.1 | 0.5 | 0.3 |
| C28 | 0.6 | 6.5 | <0.1 | 1.5 | 1.1 |
| C30 | 1.0 | 11.8 | 0.3 | 1.6 | 1.2 |
| C32 | 2.1 | 14.3 | 1.3 | 2.9 | 2.3 |
| C34 | 4.7 | 16.4 | 3.9 | 5.8 | 5.9 |
| C36 | 9.0 | 15.4 | 8.4 | 9.7 | 11.8 |
| C38 | 12.4 | 10.3 | 12.5 | 14.2 | 14.7 |
| C40 | 10.3 | 4.3 | 10.6 | 12.5 | 11.5 |
| C42 | 6.3 | 1.3 | 6.6 | 6.6 | 6.4 |
| C44 | 5.6 | 0.6 | 5.9 | 5.1 | 5.0 |
| C46 | 6.1 | 0.3 | 6.5 | 5.2 | 5.1 |
| C48 | 7.7 | 0.2 | 8.2 | 6.0 | 6.8 |
| C50 | 11.5 | 0.2 | 12.2 | 8.3 | 9.7 |
| C52 | 10.8 | 0.1 | 11.5 | 10.7 | 10.9 |
| C54 | 5.8 | <0.1 | 6.2 | 6.0 | 7.3 |

*The carbon number of fractionated butterfats were determined by gas chromatography. In this analysis triglycerides are separated based on boiling point differences. The carbon number is taken to be the sum of the number of carbon atoms on each fatty acid forming the triglyceride.
**Conditions: 190° C. @ 0.003 mm Hg Because an aspect of the present invention is to use only one or a few of these fractions for flavor development, it is beneficial to have a simple screening method to help select the best fraction for a particular application.

The fat soluble dye Victoria Blue has been described for use in identifying microbial cultures which possess enzyme systems which mediate the conversion of triglyceride fat to free fatty acids, an initial step in the conversion of fat into cheese flavors. (Harrigan and McCance, 1976, pages 77, 373–374; Umemoto and Sota 1975 a, b). For the purpose of the present invention, indicator plates have been developed in which the fat soluble dye along with individual fat fractions are mixed with molten agar at 48° C., shaken vigorously and poured immediately into petri dishes. For the evaluation of fat fractions, wells are made in the agar with the aid of one ml. pipet tip. Dilutions of the enzyme are added to the wells and incubated at 30° C. for up to 6 days. If the enzyme in the well is able to degrade the fat subfraction in the plate, a blue ring will form. Wells with blue zones around them contain enzymes which effectively degrade at least some of the triglycerides in the given fraction. Fat subfractions which do not indicate high activity in the presence of a degrading agent are not selected for further trials for that choice of enzyme or culture. Cell free culture extracts may also be evaluated by this method.

Using this method it is possible to choose from a number of fat fractions to tailor the flavor of a product to consumer tastes. For purposes of the present invention, the ability of cultures characteristic of a food product to break down specified fat fractions, is tested by this method.

For reduced fat products, a fat mimetic or substitute is added to the food. A preferred substitute is a polyol polyester.

U.S. Pat. No. 3,600,186, Mattson et al., relates sugar and sugar alcohol fatty acid polyesters as a low calorie replacement for normal triglyceride fat in food products.

Methods for preparing sugar and sugar alcohol fatty acid esters, and the composition of such esters are disclosed in U.S. Pat. No. 4,919,964, cols. 3–5. An undesirable effect of liquid polyol fatty acid polyesters is to cause anal leakage. In an attempt to avoid this problem, U.S. Pat. No. 4,005,195 and U.S. Pat. No. 4,005,196 of Jandacek, disclose a method of adding antianal leakage agents to the liquid polyesters.

Other types of reduced caloric fat substitutes are available, as discussed in U.S. Pat. No. 4,191,964, col. 6; U.S. Pat. No. 3,164,477 (sucresters); U.S. Pat. No. 4,830, 787 (homogenized cyclamate esters); U.S. Pat. No. 4,199, 608 (an edible glycerol ester); and U.S. Pat. No. 4,992,293 (thioesters).

Examples of food products with enhanced flavor effected by the present invention, are presented in Examples 2–6. For these examples, Olestra, available from Procter and Gamble, was used as the sucrose polyester.

Contrary to teachings of others, homogenizing a substantial portion of the aqueous protein composition used for some filled cultured dairy products made with a sucrose polyester, gave reduced fat products that were comparable to their full fat counterparts as determined by a panel of experts.

Even more surprising was that synergism was observed between improvements due to flavor enhancement by adding precursor fractions and improvements due to homogenizing a substantial portion of milk protein when making cheese with sucrose polyester as a fat substitute (compare EXAMPLES 6 and 7).

EXAMPLE 1

A Method for Fractionation of Butterfat

A preferred source of fat for fractionation and use as a flavor precursor, is butterfat. The following method relates fractionation of butterfat by crystallization. Results of fractionation are shown in Table 1 and 2 for 45° F. and 74° F.

1. Approximately 1000 grams of anhydrous butterfat is melted at a temperature of 140° F. (60° C.) by means of a steam jacketed kettle.

2. The melted butterfat from step 1 is fractionated into two components, the first approximately 120 grams of crystallized butterfat which separates out at approximately 86° F.; the second approximately 860 grams is liquid butterfat.

3. The liquid butterfat component of step 2 is further fractionated at approximately 72° F. into approximately 330 grams of crystallized butterfat and 500 grams of liquid butterfat.

4. The liquid butterfat component of step 3 is further fractionated at approximately 40° F. into approximately 470 grams of crystallized butterfat and 30 grams of liquid butterfat.

5. Different fractions are selected depending on the type of cultured dairy product being produced; for example, the low melting fractions are preferred for making Cheddar cheese, whereas some of the higher melting fractions (e.g. crystals forming at 86° F.) may be included when making Parmesan cheese. Other cheeses produced by the present invention include Roquefort, Mozzarella and Swiss.

EXAMPLE 2

A Method of Incorporating Fractions of Butterfat as Flavor Precursors into Production of Reduced Fat Cheese 1. A fat replaced milk is prepared by combining skim milk, polyol fatty acid polyester, and a fraction obtained by fractionating butterfat as shown in Example 1.

A. In illustrative embodiment for cheese production, the proportions of components are approximately 96.5% skim milk, approximately 3.4% polyol fatty acid polyester, and approximately 0.1% butter oil derived from a fraction that is liquid from 5° C.–22° C.

B. In an illustrative embodiment for Parmesan, the proportions of components are approximately 97.9% skim milk, approximately 2.1% polyol fatty acid polyester, and as flavor precursors, 0.05% butter oil derived from a fraction liquid at 5° C.–22° C., and 0.05% butter oil fraction liquid at 22° C.–30° C.

C. Proportions for other types of cultured dairy products are determined by the absolute purity of the fraction being used for flavor development. The more pure the fraction, the less percent of it is required to be added to the other components.

Different fractions are selected as precursors for different foods. It is expected that the purer the fractions, the less is needed for flavor development, under the assumption that the impurities do not contribute to flavor. To the extent a composition of a fraction is limited to a fraction (that is, a C6 chain length fatty acid occurs in several fractions), and that composition participates in flavor development, the quantity of a fraction added to a food may be reduced.

2. The butterfat replaced milk of step 1 is homogenized by a two stage dairy homogenizer familiar to those skilled in the art, and pasteurized by methods well known to those skilled in the art.

3. The butterfat replaced milk of step 2 is placed in a vat for processing according to conventional methods, that is, according to methods for producing a cultured dairy product that is not characterized by reduced fat content, i.e., the standard method. For example, the following are steps used to process cheese (See also U.S. Pat. No. 4,820,530):

A. Approximately 2000 lbs of the mixture of step 2 is placed in a cheese vat at a temperature of approximately 88° F.

B. Depending on the type of cheese to be produced, microbial starter cultures and adjunct cultures, are selected and added to the warmed mixture.

C. From 30–60 minutes after the starter cultures are added (dependent on the activity of the starter wherein starter activity is defined as the rate at which the cultures produce acid) the mixture is coagulated with enzymes, e.g. chymosin, at about 88° F. for approximately 30 minutes, to produce a curd.

D. The curd is cut into cubes, generally of about 3/8 inch in diameter.

E. The curd cut as in D is separated from the whey by cooking the mixture to approximately 102° F., stirring the cooked mixture to drive out the whey, and draining the whey from the curd.

F. The curd is salted and, optionally, additional flavors may be added to what is provided by the present invention. In a preferred embodiment, the salt level is approximately 3.1 lbs per 1000 lbs of mixture in the vat of step 4, additional commercial cheese ripening enzymes can be added at this point with the salt.

G. The cheese curds are then loaded into hoops and pressed.

H. The cheese is vacuum packed and aged at approximately 45° F. until flavor develops. For mild flavored cheeses, approximately 1–2 months of aging is preferred; for medium cheeses, 3–4 months; for sharp cheeses, 5–6 months.

EXAMPLE 3

Reduced (50%) Fat Cheddar Cheese Production with Enhanced Flavor Development

1. Prepare a mixture of liquid butter oil (LBO) from a butterfat fraction as a flavor precursor and skim milk (mix, homogenize and pasteurize.)

2. Standardize cheese vat milk to 1.2% fat by adding the liquid butter oil to milk.

3. Add lactic starter culture at 1.25% level.
4. Ripen for 30–60 minutes at 88° F.
5. Add coagulant and suspend agitation for 30 minutes.
6. Cut coagulum into ⅜" cubes and let heal for 15 minutes.
7. Raise temperature to 102° F. over 30 minutes.
8. Stir until the pH of the curd reaches 6.0.
9. Drain whey from curd over a 30 minute period.
10. Salt curd with NaCl when pH of curd is 5.6–5.8 additional cheese ripening enzymes can be added at this point with the salt.
11. Press cheese under vacuum.
12. Package cheese blocks in air tight plastic bags.
13. Cure cheese blocks until flavor develops.

EXAMPLE 4

Fat Free Cheddar Cheese Production with Enhanced Flavor Development

1. Add a fat replacement (for example, a sucrose polyester) or fat mimetic to skim milk in a cheese vat at an approximately 2.5–3.6% level.
2. Add a fraction of liquid butter oil as a flavor precursor to a level in vat milk which will yield fat in final product of less than 1.74%.
3. Add starter cultures [*Streptococcus lactis; Streptococcus cremoris; Lactobacillus helveticus; Streptococcus thermophilis*], adjunct cultures [*Diacty lactis*] and any ripening enzymes [lipase, protease, and peptidase enzymes] to the cheese milk and ripen for about 30–60 minutes at 88° F.
4. Add coagulant and suspend agitation for 30 minutes to produce a coagulum.
5. Cut coagulum into ⅜" cubes and let heal for 15 minutes.
6. Raise temperature to 102° F. over a 30 minute period.
7. Stir until curd pH reaches 6.0.
8. Drain whey from curd over a 30 minute period.
9. Salt curd with NaCl when pH of curd is above 5.6–5.8. Additional cheese ripening enzymes are optionally added at this point with the salt.
10. Press cheese under vacuum.
11. Package cheese blocks in air tight plastic bags.
12. Cure cheese blocks until flavor develops.

EXAMPLE 5

Method for Producing Fat Free Yogurt Having a Butter Fraction as a Flavor Precursor Table 3 summarizes steps to manufacture a fat free yogurt. A butterfat replacement is prepared which consists of 36% sucrose polyol polyester in skim milk. Approximately 5.5 pounds of this replacement is blended with approximately 88.5 pounds of condensed skim milk which has a composition of 20% solids, by means of a Breddo Blender at 150° F. for 60 seconds. The fat fraction of the present invention may be added here or from any point on in the process, as long as the addition is at a point allowing time for flavor to develop.

The blended composition is then pasteurized by heating at approximately 185° F. for about 30 minutes. The pasteurized composition is homogenized at a temperature of approximately 150° F. at a pressure of 2500 psi by means of a Joulin single stage homogenizer (a 1500–5000 psi is suitable).

The homogenized mixture is placed in a hold tank and mixed with about 6 pounds of a starter culture composition at about 35°–40° F. for 5 minutes by means of a tank agitation. The flavor precursor fraction is present at least by this time. The starter culture composition consists of a starter culture, about 12% NFDM (non-fat dry milk), and about 6.7% LBO (liquid butter oil fraction), prepared by mixing these ingredients for 16–18 hours at about 40° F. The starter culture includes *Lactobacillus bulgaricus* or *Streptococcus thermophilis*.

A filling machine portions the product into its containers. The product is in the hold tank. Packaging includes portioning the product into cups or pouches.

The packaged product is fermented at 108° F. for about 3 hours, after which the finished product is cooled to about 35√ to 40° F.

Table 3: Fat Free Yogurt Production with Butter Fraction as Flavor Precursor (per 100 pounds final product

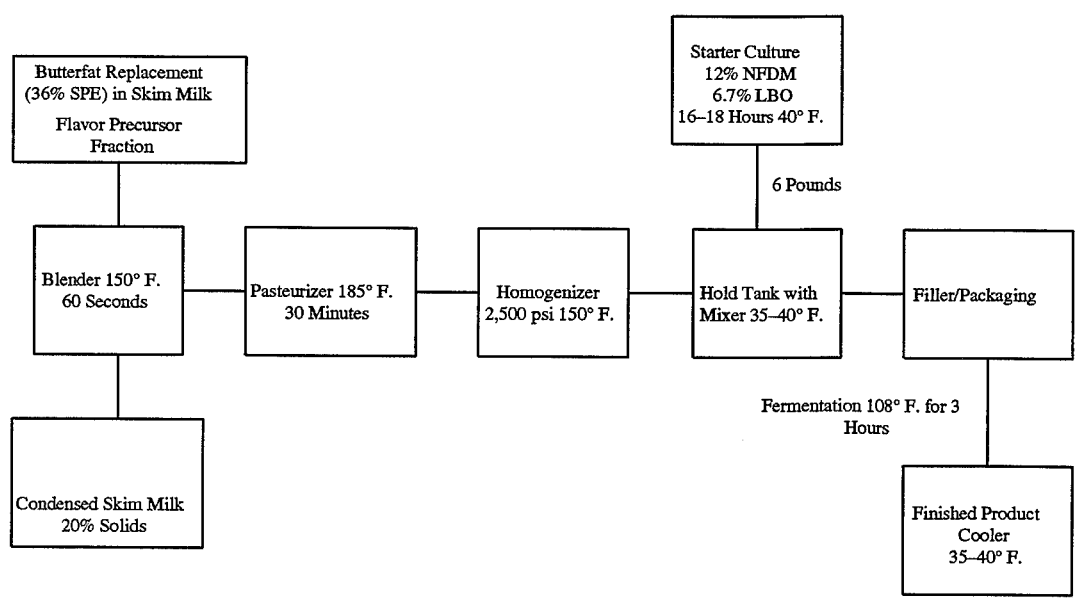

EXAMPLE 6

Product Evaluation of Commercial Full Fat and Fat Free Cheddars vs. Two Prototypes in which Flavor was Added According to the Invention A panel of five expert cheese graders evaluated products in blind tests generally conducted as follows:

Samples: Commercial Full Fat Cheddar (Kraft Natural Cheese); Fat Free Cheddar (Example 4) with flavor fraction; and Fat Free Cheddar without flavor fraction and a Commercial Fat Free Cheddar (Alpine Lace™ Cheddar). The flavor fraction was that fraction liquid at 45° C. (see Tables 1 and 2.)

Products were evaluated for texture (T), mouthful (M), flavor (F), and overall acceptance (OA) on a 9 point hedonic scale. Samples were served refrigerated, cut into ½"×½"× 1.5" sticks.

Results:

| | | T | M | F | OA |
|---|---|---|---|---|---|
| 1. | Commercial Full Fat Cheddar | 7.40 | 7.40 | 6.20 | 6.80 |
| 2. | Fat Free Cheddar with Flavor System of the Present Invention | 6.40 | 6.60 | 5.40 | 6.20 |
| 3 | Fat Free Cheddar without Flavor System | 5.40 | 6.40 | 3.40 | 4.40 |
| 4. | Commercial Fat Free Cheddar | 2.40 | 3.00 | 3.40 | 3.20 |

As can be seen from the results, a commercial fat free Cheddar fell far short of the product evaluation of a commercial full fat Cheddar. A fat free Cheddar being developed for use in the present invention showed flavor and overall acceptance to jump from levels associated with a commercial fat free Cheddar to a level of overall acceptance of full fat Cheddar, and to a flavor approaching that of a full fat Cheddar, when the methods of flavor enhancement of the present invention were applied.

EXAMPLE 7

Product Evaluation of Commercial Full Fat and Fat Free Cheddars vs. Two Prototypes Prepared According to the Invention Combining the flavor enhancement steps and the improved cheese making steps of the present invention which include homogenizing a substantial portion of the aqueous protein composition with a polyol polyester (SPE) used as a fat substitute, showed an even greater concordance between full fat and fat free Cheddar cheese, than was shown in EXAMPLE 6. In this example all of the aqueous protein was subject to high shear homogenization with SPE.

A panel of expert graders evaluated the products in blind tests, the results of which are as follows:

Samples:
1. Commercial Full Fat Cheddar
2. Fat Free Cheddar with flavor system (all milk homogenized)
3. Fat Free Cheddar with flavor system (only 3.6% of the milk homogenized)

Products were evaluated for texture (T), mouthfeel (M), flavor (F), and overall liking (OL) on a 9 point hedonic scale. Samples were served refrigerated, cut into ½"×½"×2" sticks.

Results:

| | | T | M | F | OA |
|---|---|---|---|---|---|
| 1. | Commercial Full Fat Cheddar | 6.80 | 6.70 | 7.20 | 7.20 |
| 2. | Fat Free Cheddar with Flavor System of the Present Invention (all Milk Homogenized) | 5.80 | 5.80 | 6.30 | 6.30 |
| 3. | Fat Free Cheddar With Flavor System of the Present Invention (3.6% of the Milk Homogenized) | 5.80 | 5.00 | 6.30 | 6.20 |

REFERENCES

The references listed below are incorporated herein by reference to the extent that they supplement, explain, provide a background for, or teach methodology, techniques, and/or compositions employed herein.

Amer, M. A., et al., (1985) Physical and chemical characterization of butterfat fractions obtained by crystallization from molten fat, AOCS meeting, *Philadelphia* 1551–1557.

Bruhn, C. M. et al., (1992) Consumer attitudes and market potential for dairy products utilizing fat substitutes. *J. of Dairy Sci.*, 75: 2569–2577.

Chapman and Sharpe (1981) in Robinson (1981).

Davis, J. G. (1965) Cheese. *Basic Technology*, v.I., American Elsevier Publishing Company, Inc.

Deffense, E. (1992) Milk fat fractionation today. *AOCS Meeting, Toronto*, May 10, 1992.

Ha and Lindsay (1993) Release of volatile branched chain and other fatty acids from ruminant milk fats by various lipases. *J. Dairy Sci.* 76:677–690

Harrigan, W. F. and McCance, M. E. (1976) *Laboratory Methods in Food and Dairy Microbiology*, Academic Press, N.Y.

Kaylegian, E., Hartel, R. N. and Lindsay, R. C. (1993) Applications of modified milk fat in food products, *J. of Dairy Science* 76: 1782–1796.

Kaylegian, K. E., and R. C. Lindsay (1992) Performance of selected milkfat fractions in cold-spreadable butter. *J. Dairy Sci.* 75:3307.

Robinson, R. K. (1981) The Microbiology of Milk Products, v. 2, Chap. 6 in *Dairy Microbiology*, Applied Science Publishers, N.J.

Umemoto, Y. and Sota, Y. (1975 a) Lipolysis by lactic acid bacteria recognized through color changes of dye-stained butterfats on double-layered agar plates. *Milchwisserschaft* 30:591–594.; (1975 b) Relation of Cheddar cheese ripening to bacterial lipolysis. *Ag. and Bio. Chem.* 39:2115–2122.

U.S. Pat. No. 3,164,477
U.S. Pat. No. 3,600,186
U.S. Pat. No. 4,005,195
U.S. Pat. No. 4,005,196
U.S. Pat. No. 4,191,964
U.S. Pat. No. 4,199,608
U.S. Pat. No. 4,324,804
U.S. Pat. No. 4,820,530
U.S. Pat. No. 4,830,787
U.S. Pat. No. 4,919,964
U.S. Pat. No. 4,992,293

What is claimed is:

1. A method for preparing a cultured dairy product having a reduced fat content, said method comprising the steps of:

(a) preparing a fat-replaced milk by a process comprising the steps of:
   (1) combining an aqueous protein composition comprising milk protein with a fat substitute to form a mixture; and
   (2) homogenizing the mixture to form the fat-replaced milk; and
(b) processing the fat-replaced milk to form the cultured dairy product; wherein a small amount of a fat fraction relative to the finished product is incorporated into the cultured dairy product at or prior to flavor development by combining the fat fraction with the aqueous protein composition and the fat substitute to form the mixture of step (a)(1) or by adding the fat fraction to the fat-replaced milk during the processing step (b), wherein said fat fraction is derived from a fat source selected from the group consisting of milk fat, animal fat and vegetable fat and remains liquid at or below 74° F.

2. The method of claim 1, wherein the fat substitute is a polyol fatty acid polyester.

3. The method of claim 2, wherein the polyol fatty acid polyester is less than about 6% of the homogenized mixture.

4. The method of claim 2, wherein the polyol polyester is a sucrose polyester.

5. The method of claim 4, wherein the sucrose polyester is derived from soybean oil and has a complete melting point of 148° F.

6. The method of claim 1, wherein the cultured dairy product is a cheese.

7. The method of claim 1, wherein the homogenized mixture is inoculated with an acidifying agent.

8. The method of claim 7, wherein the acidifying agent is an organic acid.

9. The method of claim 7, wherein the acidifying agent is a starter characteristic of Cheddar cheese products.

10. The method of claim 7, wherein the acidifying agent is a cheese starter characteristic of Mozzarella, Swiss or Parmesan.

11. The method of claim 7, wherein the acidifying agent is added at a temperature of between 65°–94° F.

12. The method of claim 1, wherein the cultured dairy product is prepared with additional aqueous protein composition and wherein at least 50% of the total aqueous protein composition is used in step (a) to prepare the fat-replaced milk.

13. The method of claim 12, wherein the substantial amount is 100% of the quantity of aqueous protein composition.

14. The method or claim 1, wherein the fat fraction remains liquid when cooled to 45° F.

15. The method of claim 14, wherein the fat source is milkfat.

16. A cultured dairy product having a reduced fat content, wherein said cultured dairy product is prepared by a process comprising the steps of:
   (a) preparing a fat-replaced milk by a process comprising the steps of:
      (1) combining an aqueous protein composition comprising milk protein with a fat substitute to form a mixture; and
      (2) homogenizing the mixture to form the fat-replaced milk; and
   (b) processing the fat-replaced milk to form the cultured dairy product;
wherein a small amount of a fat fraction relative to the finished product is incorporated into the cultured dairy product at or prior to flavor development by combining the fat fraction with the aqueous protein composition and the fat substitute to form the mixture of step (a)(1) or by adding the fat fraction to the fat-replaced milk during the processing step (b), wherein said fat fraction is derived from a fat source selected from the group consisting of milk fat, animal fat and vegetable fat and remains liquid at or below 74° F.

17. The product of claim 16, wherein the fat substitute is a polyol fatty acid polyester.

18. The product of claim 17, wherein the polyol polyester is a sucrose polyester.

19. The product of claim 18, wherein the sucrose polyester is derived from soybean oil and has a complete melting point of 148° F.

20. The product of claim 16, wherein the cultured dairy product is a cheese.

21. The product of claim 16, wherein an acidifying agent is added.

22. The product of claim 21, wherein the acidifying acid is an organic acid.

23. The product of claim 21, wherein the acidifying agent is a cheese starter characteristic of a Cheddar cheese product.

24. The product of claim 21, wherein the acidifying agent is added at a temperature of between 65°–94° F.

25. The cultured dairy product of claim 16 wherein the fat fraction remains liquid at 45° F.

26. The cultured dairy product of claim 25 wherein the fat source is milkfat.

* * * * *